(No Model.)
J. L. SCHRUBEN & W. F. LEONARD.
IRON WHEEL.
No. 284,074. Patented Aug. 28, 1883.
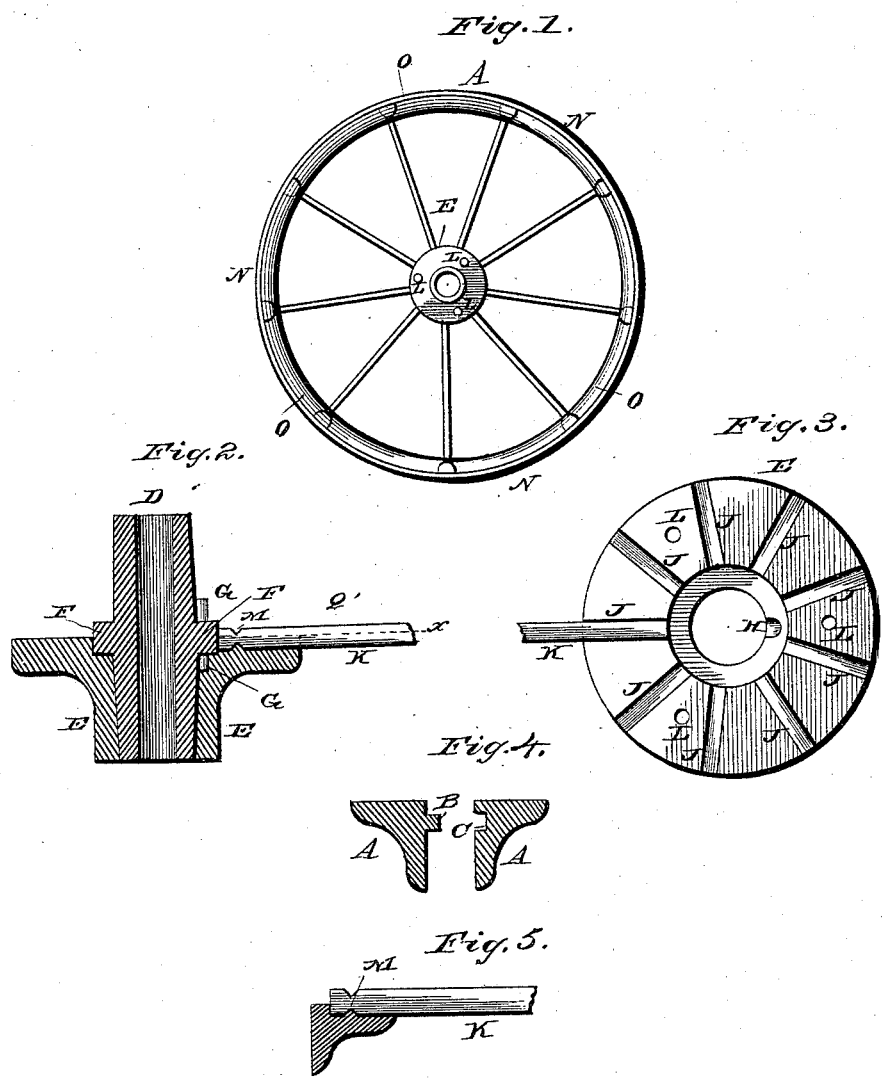

United States Patent Office.

JAMES L. SCHRUBEN AND WILLIAM F. LEONARD, OF LAFAYETTE, IND.

IRON WHEEL.

SPECIFICATION forming part of Letters Patent No. 284,074, dated August 28, 1883.

Application filed April 30, 1883. (No model.)

*To all whom it may concern:*

Be it known that we, JAMES L. SCHRUBEN and WILLIAM F. LEONARD, citizens of the United States, residing at Lafayette, in the county of Tippecanoe and State of Indiana, have invented a new and useful Iron Wheel for Agricultural Machinery and General Purposes, of which the following is a specification.

Our invention relates to improvements in iron wheels, as set forth, in which cast, wrought, and malleable iron are combined and used in the construction thereof; also, in having the different parts of the said wheel so arranged as to admit of an easy construction and interchange of parts thereof when rendered useless without discarding the remainder of the wheel not worn out or broken. We attain these objects by the form and arrangement of the different parts illustrated in the accompanying drawings, in which—

Figure 1 is a complete face view of wheel; Fig. 2, a sectional view of thimble and hub; Fig. 3, an interior face view of hub; Fig. 4, a sectional view of rim of wheel; and Fig. 5, a sectional view of one-half of rim, showing manner of securing and holding the spokes and rim together.

Similar letters refer to similar parts throughout the several views.

The rim of the wheel is made of three or more segments to the entire circumference, and in two halves, as indicated in section at Fig. 4, with a fillet, B, extending continuously around one half of rim, to fit in a corresponding groove, C, in the other half of rim. The thimble D, with one-half of hub E, is shown in section at Fig. 2. The thimble D has a bead, F, around the same, for the purpose of holding the thimble in position in the hub, and the lugs G are to fit in a corresponding groove in hub E, for the purpose of holding the thimble in position and preventing its slipping or turning in the hub.

At Fig. 3, J shows the grooves in hub E, which grooves radiate from the center of hub, as indicated at Q', Fig. 2, $x$ being an imaginary line showing the center line, and the pitch-line of groove in this manner forming a dish for the wheel by throwing the spokes K off from a direct line through center, the two halves of hub E being secured together with bolts, as indicated at L.

At Fig. 5 is shown the manner of securing the spoke K to rim A, and the same manner of fastening spoke in hub E is employed as shown at Fig. 2, by the means of notches M in the spokes, to fit a projection in the rim or hub, the two halves of both rim and hub being riveted or bolted together after placing spokes K in position, and the manner of breaking joints of the different segments of rim A being shown by full and dotted lines at N and O, Fig. 1, substantially and for the purposes as set forth.

We claim as our invention—

In a metal wheel, the combination of a vertically-divided flanged hub, which is radially grooved and provided with ribs M for holding the spokes, the thimble having a bead, F, and lugs G, fitted into said hub, and a sectional rim breaking joints, and having tongues and grooves, and also ribs, all constructed and adapted to operate substantially in the manner and for the purposes described.

JAMES L. SCHRUBEN.
WILLIAM F. LEONARD.

Witnesses:
WILLIAM SCHILLING,
PATRICK J. VAUGHAN.